US009087529B2

(12) United States Patent
Nojima et al.

(10) Patent No.: US 9,087,529 B2
(45) Date of Patent: Jul. 21, 2015

(54) MANUFACTURING METHOD OF MAGNET HEAD ABLE TO REDUCE ELECTRODE FILM FOR PLATING

(71) Applicant: TDK Corporation, Tokyo (JP)

(72) Inventors: Tatsuhiro Nojima, Tokyo (JP); Ken Fujii, Tokyo (JP)

(73) Assignee: TDK Corporation, Tokyo (JP)

( * ) Notice: Subject to any disclaimer, the term of this patent is extended or adjusted under 35 U.S.C. 154(b) by 74 days.

(21) Appl. No.: 13/845,580

(22) Filed: Mar. 18, 2013

(65) Prior Publication Data

US 2014/0268424 A1     Sep. 18, 2014

(51) Int. Cl.
G11B 5/187     (2006.01)
G11B 5/127     (2006.01)
G11B 5/31      (2006.01)
G11B 5/39      (2006.01)

(52) U.S. Cl.
CPC ............ G11B 5/3116 (2013.01); G11B 5/1871 (2013.01); G11B 5/3163 (2013.01); G11B 5/3903 (2013.01); G11B 5/3967 (2013.01); Y10T 29/49032 (2015.01); Y10T 29/49052 (2015.01)

(58) Field of Classification Search
CPC .. G11B 5/1871; G11B 5/3116; G11B 5/3163; G11B 5/3903; G11B 5/3967; Y10T 29/49032; Y10T 29/49052

USPC ............... 29/603.07, 603.12, 603.15, 603.16, 29/603.18; 360/319, 322, 324.11, 324.12, 360/125.09, 125.22

See application file for complete search history.

(56) References Cited

U.S. PATENT DOCUMENTS

2003/0179519 A1*  9/2003  Hasegawa ................ 360/324.12
2007/0115584 A1*  5/2007  Balamane et al. ... 360/125.09 X
2011/0249364 A1  10/2011  Bai et al.

FOREIGN PATENT DOCUMENTS

JP     2010129100 A  *  6/2010

* cited by examiner

Primary Examiner — A. Dexter Tugbang
(74) Attorney, Agent, or Firm — Posz Law Group, PLC

(57) ABSTRACT

Method for manufacturing a magnetic head includes providing a stopper layer on an upper surface of a main magnetic pole layer applying a magnetic flux to a recording medium via a first insulation layer, providing a second insulation layer on the upper surface of the first insulation layer to cover at least an entire surface of the stopper layer, covering an upper surface portion of the second insulation layer with a mask layer, forming a height difference portion by removing at least a first insulation layer portion not covered by the mask layer by etching to at least partially remove at least a stopper layer portion in a film thickness direction, and subsequently by removing the mask layer, forming a electrode film in the height difference portion, and forming a plating film, which is a magnetic shield for the main magnetic pole layer, on an upper surface of the electrode.

5 Claims, 4 Drawing Sheets

MANUFACTURING METHOD OF MAGNET HEAD ABLE TO REDUCE ELECTRODE FILM FOR PLATING

BACKGROUND OF THE INVENTION

1. Field of the Invention

The present invention relates to a manufacturing method for a magnetic head, and particularly relates to a manufacturing method for a magnetic shield in which an electrode film of a plating film is reduced.

2. Description of the Related Art

A hard disk drive includes a magnetic head for recording into a hard disk, which is a recording medium, and for reading from the hard disk. Recently, because of reduction of track intervals in association with higher recording density of the hard disk, problems of adjacent track erasure (ATE) and wide area track erasure (WATE) have become obvious. The ATE is a phenomenon where magnetic information recorded in adjacent tracks is erased due to a magnetic flux from a magnetic head. The WATE is a phenomenon where magnetic information recorded not only in adjacent tracks but also in wider tracks is erased due to a magnetic flux from a magnetic head.

The ATE and WATE can be restrained by a magnetic shield provided near a main magnetic pole layer. The magnetic shield is normally made of a plating film. The ATE and WATE are further effectively restrained by optimizing a shape and materials of the magnetic shield. In the meantime, since the magnetic shield is preferably formed in proximity to the main magnetic pole layer as much as possible, the magnetic shield has a shape to protrude downwardly toward a substrate in the vicinity of an air bearing surface. Consequently, the magnetic shield is formed in a plurality of plating steps. As a result, an electrode film remains in the magnetic shield because of the plating steps. The remaining electrode film causes an unintentional magnetic flux in the adjacent tracks or neighborhood tracks from an exposed portion on the air bearing surface, causing the ATE and WATE.

A magnetic head and a manufacturing method thereof that can respond to the problems above are described in US2011/0249364. A sacrificial layer is pre-formed on the main magnetic pole layer. The sacrificial layer is provided from a position to be an air bearing surface to another position away from the air bearing surface by a predetermined distance in a vertical direction. Next, an insulation layer is formed behind of the sacrificial layer viewing from the air bearing surface. After a coil is formed, the sacrificial layer is removed, and a plating film is formed. With this step, the plating film having a front end portion protruding downward on the air bearing surface can be formed in one plating step, and any remainder of the electrode film between the plating films is prevented.

However, these steps require three steps, which are to provide the sacrificial layer, to provide the insulation layer behind that layer, and then to remove the sacrificial layer.

An objective of the present invention is to provide a manufacturing method for a magnetic head in which an electrode film exposed to the air bearing surface does not remain in the magnetic shield composed of a plating film, and in which the magnetic shield is formed with simple steps.

SUMMARY OF THE INVENTION

A method of the present invention for manufacturing a magnetic head includes providing a stopper layer on an upper surface of a main magnetic pole layer that applies a magnetic flux to a recording medium, via a first insulation layer, providing a second insulation layer on the upper surface of the first insulation layer so as to cover at least an entire surface of the stopper layer, covering a portion of the upper surface of the second insulation layer with a mask layer, forming a height difference portion configured with a first surface, which is an upper surface of the second insulation layer protected by the mask layer, a second surface closer to the main magnetic pole layer than the first surface, and a side surface connecting the first surface and the second surface, by removing at least a portion of the first insulation layer that is not covered by the mask layer by etching so as to at least partially remove at least a portion of the stopper layer in a film thickness direction, and subsequently by removing the mask layer, forming a electrode film on the first surface, the second surface and the side surface of the height difference portion, and forming a plating film, which is a magnetic shield for the main magnetic pole layer, on an upper surface of the electrode.

Etching of a second insulation layer is restricted by a stopper layer and a mask layer, and as a result, the surface of the second insulation layer is formed to be a height difference shape protruding downward near the air bearing surface. Since the electrode film is formed on the first and the second surfaces and the side surface of the height difference portion, the plating film can be formed in a single plating step. Therefore, any unnecessary electrode film does not remain in the plating film. Further, since the desired height difference shape is formed merely by providing the stopper layer and the mask layer, the step is simplified.

The above-mentioned and other objectives, characteristics and advantages of the present invention are clarified with detailed description mentioned below with reference to drawings exemplarily illustrating the present application.

DETAILED DESCRIPTION OF THE INVENTION

Figure 1:
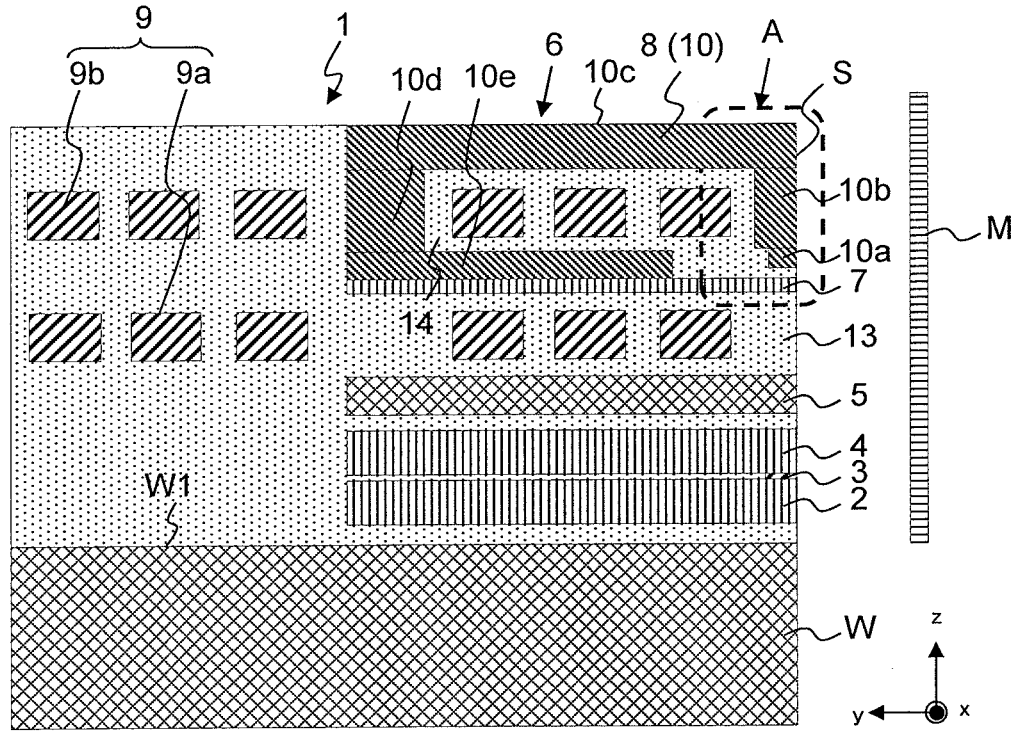
FIG. 1 is a cross-sectional view of principal parts of a magnetic head relating to the present invention.
Figure 2:
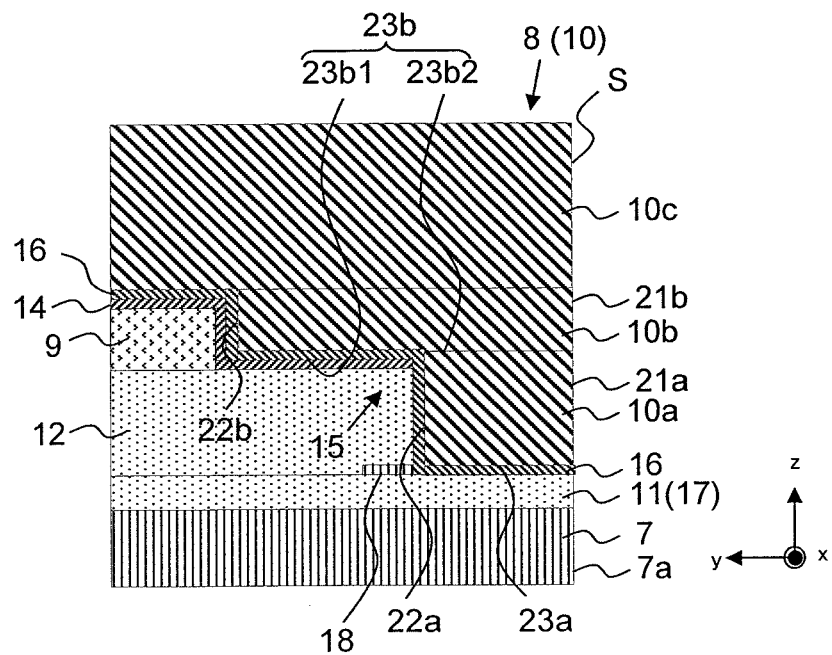
FIG. 2 is an enlarged cross-sectional view of a portion A in FIG. 1.

At first, an embodiment of a magnetic head 1 relating to the present invention is described. FIG. 1 illustrates a cross-sectional view of principal parts of a magnetic head, and FIG. 2 illustrates an enlarged cross-sectional view of a portion A in FIG. 1.

In the present specification, the x direction means a track width direction of a magnetic recording medium. The y direction means a direction perpendicular to an air bearing surface S of the magnetic head. The z direction means a direction perpendicular to a principle plane of a substrate W1 (a plane of the substrate W where a magnetic resistive (MR) element, a magnetic recording element and the like are formed) of the substrate W. The z direction is matched with a film formation direction in a wafer step or a relative movement direction of the magnetic head 1 relative to a track circumferential direction of a magnetic recording medium M. The x, y and z directions are perpendicular to each other. "Upward" and "downward" mean a direction away from the substrate W and a direction approaching to the substrate W relative to the z direction, respectively.

On the substrate (wafer) W, an MR element 3 where its front end portion is positioned on the air bearing surface S opposing to the magnetic recording medium M, an upper part shield layer 4 and a lower part shield layer 2 provided at both sides of the MR element 3 in the z direction are formed. The MR element 3 can be any of current in plane (CIP)—gigantic magneto resistive (GMR) element where a sense current flows in the x direction, current perpendicular to plane (CPP)—gigantic magneto resistive (GMR) element where a sense current flows in the z direction and a tunneling magneto resistive element where a sense current flows in the z direction and where a tunnel effect is utilized. When the MR element 3 is the CPP-GMR element or the TMR element, the upper part shield layer 4 and the lower part shield layer 2 are utilized as electrodes that supply a sense current, as well.

A magnetic recording element 6 for perpendicular magnetic recording is provided above the upper part shield layer 4 via an in-element shield layer 5 formed by sputtering. The magnetic recording element 6 has a main magnetic pole layer 7. The main magnetic pole layer 7 generates a magnetic flux for recording, and the generated magnetic flux is applied to the recording medium M. The main magnetic pole layer 7 is formed with an alloy made of any two or three of Ni, Fe, for example, FeCo. The main magnetic pole layer 7 has an end part 7a on the air bearing surface S, and it extends to a direction (y direction) substantially perpendicular to the air bearing surface S. A coil 9 is wound around the main magnetic pole layer 7 via insulation layers 13 and 14, and a magnetic flux is led to the main magnetic pole layer 7 by the coil 9.

The magnetic recording element 6 has a magnetic shield 8 that is magnetically linked with the main magnetic pole layer 7. The magnetic shield 8 absorbs a magnetic flux that is emitted from the main magnetic pole layer 7, and restricts the magnetic flux that is applied to the track around the periphery of the track where recording is conducted. The magnetic shield 8 is also referred to as a return shield since it absorbs mainly a magnetic flux that re-appears on the surface of the recording medium M via the inside of the recording medium M. The magnetic shield 8 is made of a plating film 10 composed of first to fifth plating parts 10a to 10e. The first to fifth plating parts 10a to 10e can be formed with an alloy made of any two or three of Ni, Fe and Co, for example, FeCo. On the air bearing surface S and in its proximity, the main magnetic pole layer 7 and the magnetic shield 8 are separated via an insulation layer made of $Al_2O_3$. An insulation layer, as described later, is composed of a first insulation layer 11 and a second insulation layer 12, and the first insulation layer 11 also constitutes a gap layer 17.

The first plating part 10a faces the air bearing surface S, and, is provided in proximity to the main magnetic pole layer 7. The second plating part 10b is adjacent to the first plating part 10a in the z direction, and, is provided over the first plating part 10a in the z direction. In other words, the first plating part 10a is positioned closer to the substrate W than the second plating part 10b. For the first and second plating parts 10a and 10b, their front end portions 21a and 21b are positioned on the air bearing surface S, and a magnetic flux is absorbed mainly from these front end portions 21a and 21b. The first plating part 10a has shorter length in the y direction than the second plating part 10b. Therefore, a height difference part 15 is formed between the first plating part 10a and the second plating part 10b. As described later, the first and second plating parts 10a and 10b are simultaneously formed in one plating step, and they are integrated with each other.

The third plating part 10c is connected to the second plating part 10b and extends in the y direction. The fourth plating part 10d is connected to the third plating part 10c and extends in the z direction. The fifth plating part 10e is connected to the fourth plating part 10d and extends in the y direction. The fifth plating part 10e is linked with the main magnetic pole layer 7. The first to fifth plating parts 10a to 10e extend around the periphery of the coil 9 so as to avoid the contact with the coil 9, and an insulation layer 14 is provided between the first to fifth plating parts 10a to 10e and the coil 9. The first to fifth plating parts 10a to 10e are magnetically linked, and propagate the magnetic fluxes absorbed by the first and second plating parts 10 and 10b to the main magnetic pole layer 7.

An electrode film 16 for forming the first and second plating parts 10a and 10b is provided on rear surfaces 22a and 22b of the first and second plating parts 10a and 10b as seen from the air bearing surface W, respectively, a bottom surface 23a facing the substrate W of the first plating part 10a, and a portion 23b1 that does not make contact with the first plating part 10a of the bottom surface 23b facing the substrate W of the second part 10b. In other words, the electrode film 16 is not provided in the portion 23b2 that makes contact with the first plating part 10a, i.e., an interface of the first plating part 10a and the second plating part 10b, out of the bottom surface 23b facing the substrate W of the second plating part 10b. Since the electrode film 16 that was conventionally exposed between the first plating part 10a and the second plating part 10b does not exist in the magnetic head 1 of the present embodiment, occurrence of ATE and WATE is restrained. Further, since the electrode film does not exist in the interface between the second plating part 10b and the third plating part 10c, as well, the exposure of the electrode film along the interface to the air bearing surface S is prevented and the occurrence of ATE and WATE is further restrained.

Next, a manufacturing method for the magnetic head 1 described above is explained with reference to FIG. 1 and FIGS. 3A to 3H.

(Step 1) First, as shown in FIG. 1, the lower part shield layer 2, the MR element 3, the upper part shield layer 4 and the in-element shield 5 are formed on the substrate W (wafer) by a known method.

(Step 2) Next, as shown in FIG. 1, the insulation layer 13 is formed by sputtering, and a lower portion 9a of the coil 9 is formed using a plating method.

(Step 3) Next, as shown in FIG. 1, the main magnetic pole layer 7 is formed above the lower portion 9a of the coil 9 via the insulation layer 13. The main magnetic pole layer 7 is formed using the plating method.

Figure 3A:
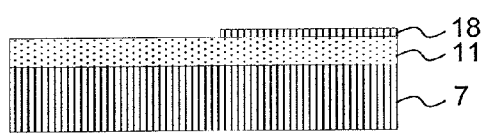
FIGS. 3A to 3H are step diagrams showing a manufacturing method for a magnetic head relating to the present invention.

(Step 4) Next, as shown in FIG. 3A, a stopper layer 18 is provided above the upper surface of the main magnetic pole layer 7 with the first insulation layer 11 therebetween. The first insulation layer 11 and the stopper layer 18 are formed by sputtering. The first insulation layer 11 is made of, for example, $Al_2O_3$. The stopper layer 18 can be formed with MgO, $SiO_2$, Ru and the like, and has a lower etching rate than the second insulation layer 12 as described later. Consequently, the stopper layer 18 restricts the lower end of the second insulation layer 12 in the z direction to be removed when the second insulation layer 12 is removed by etching. In this step, the fifth plating part 10e is also formed simultaneously.

Figure 3B:
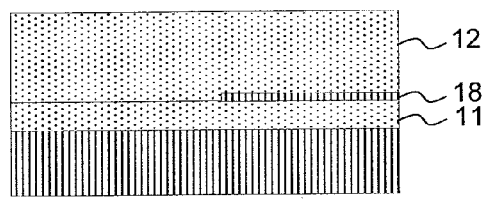

(Step 5) Next, as shown in FIG. 3B, the second insulation layer 12 is provided on the upper surface of the first insulation layer 11 so as to cover at least the entire surface of the stopper layer 18. The second insulation layer 12 is formed by sputtering. The second insulation layer 12 is preferably formed with the same material as the first insulation layer 11, for example, $Al_2O_3$.

Figure 3C:
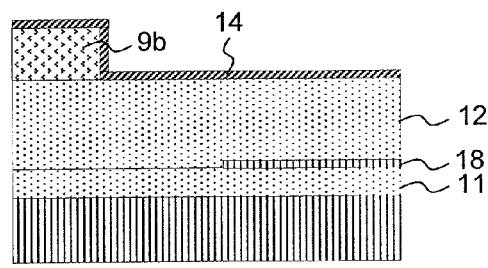

(Step 6) Next, as shown in FIG. 3C, an upper portion 9b is formed on the upper surface of the second insulation layer 12 using the plating method. Then, the insulation layer 14 for insulating the coil 9 from the magnetic shield 8 is formed on the upper surface and the side of the upper portion 9b of the coil 9 and the upper surface of the second insulation layer 12 where no upper portion 9b is formed. The insulation layer 14 is formed by sputtering. The fourth plating part 10d is also formed simultaneously in this step.

Figure 3D:
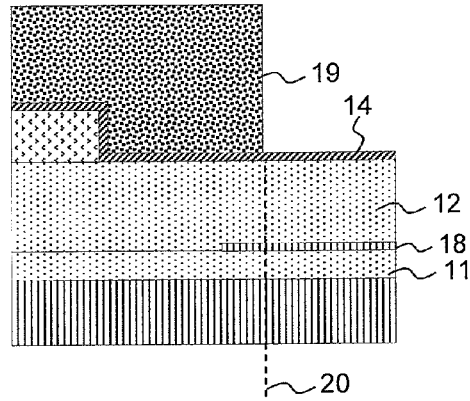

(Step 7) Next, as shown in FIG. 3D, a portion of the upper surface of the second insulation layer 12 is covered with a mask layer 19. The mask layer 19 can be formed with photoresist. The mask layer 19 defines an end part in the y direction of the second insulation layer 12 to be removed when the second insulation layer 12 is removed by etching.

Figure 3E:
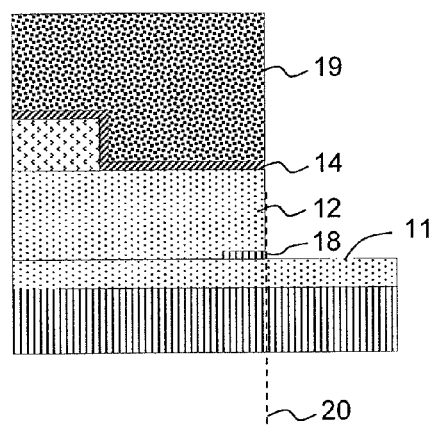

(Step 8) Next, as shown in FIG. 3E, the second insulation layer 12 and the insulation layer 14 that are not covered with the mask layer 19 are removed by etching. When the photoresist is used as the mask layer 19, reactive ion etching (RIE) is preferably used. In the present embodiment, the second insulation layer 12 and the insulation layer 14 are removed along a virtual line 20 drawn from the end part of the mask layer 19 in the z direction. Since the stopper layer 18 extends in the y direction to a position away from the air bearing surface S beyond the virtual line 20, even when a portion of the second insulation layer 12 away from the air bearing surface S beyond the virtual line 20 is removed, the first insulation layer 11 is protected by the stopper layer 18. In the present embodiment, a portion of the stopper layer 18 that is closer to the air bearing surface S than the virtual line 20 is all removed. Furthermore, the stopper layer 18 may end at the position of the virtual line 20, and in that case, the stopper layer 18 is completely removed.

Figure 3F:
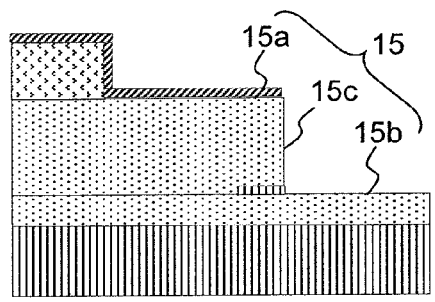

(Step 9) Next, as shown in FIG. 3F, the mask layer 19 is removed. The height difference part 15 is formed, which is composed of a first surface 15a, which is an upper surface of the second insulation layer 12 (to be more accurate, an upper surface of the insulation layer 14) protected by the mask layer 19, a second surface 15b, which is positioned at the lower side than the first surface 15a in the z direction and which is closer to the main magnetic pole layer 7 than the first surface 15a, and a side surface 15c connecting the first surface 15a and the second surface 15b. In the present embodiment, the side surface 15c is formed perpendicularly to the first and second surfaces 15a and 15b.

Figure 3H:
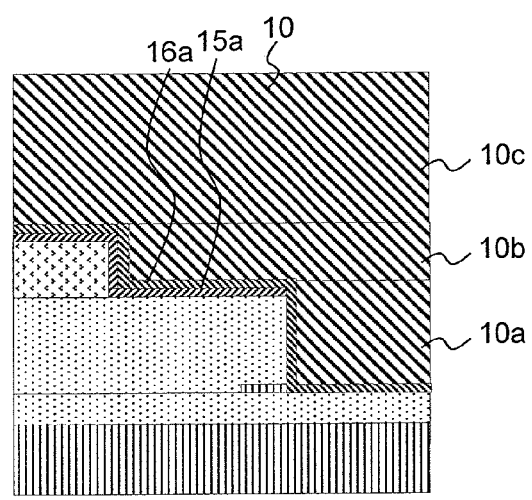
Figure 3G:
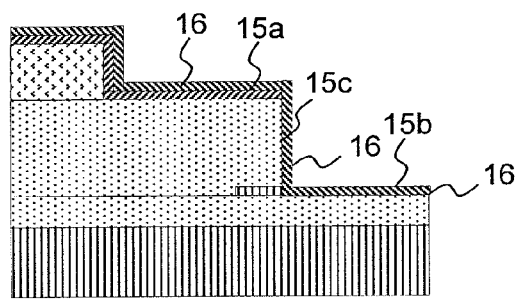

(Step 10) Next, as shown in FIG. 3G, the electrode film 16 is formed on the first surface 15a, the second surface 15b and the side surface 15c of the step portion 15. The electrode film 16 is formed with, for example, Cu, Fe, Ni or Co, or their alloys.

(Step 11) Next, as shown in FIG. 3H, the first to third plating parts 10a to 10c of the plating film 10, which is the magnetic shield 8 of the main magnetic pole layer 7, are formed on the upper surface of the electrode film 16. The plating film 10 is formed in the entire region of the electrode film 16 up to a position over an electrode film 16a formed on the first surface 15a, and the first to the third plating parts 10a to 10c are simultaneously formed.

(Step 12) Then, while the illustration is omitted, an overcoating layer is formed on the playing film 10, and electrode pads that are electrically connected to the main magnetic pole layer 7 and the MR element 3, and the like are formed. Continuously, the wafer is cut, and many magnetic heads 1 (sliders of the magnetic head 1) are obtained.

Figure 4:
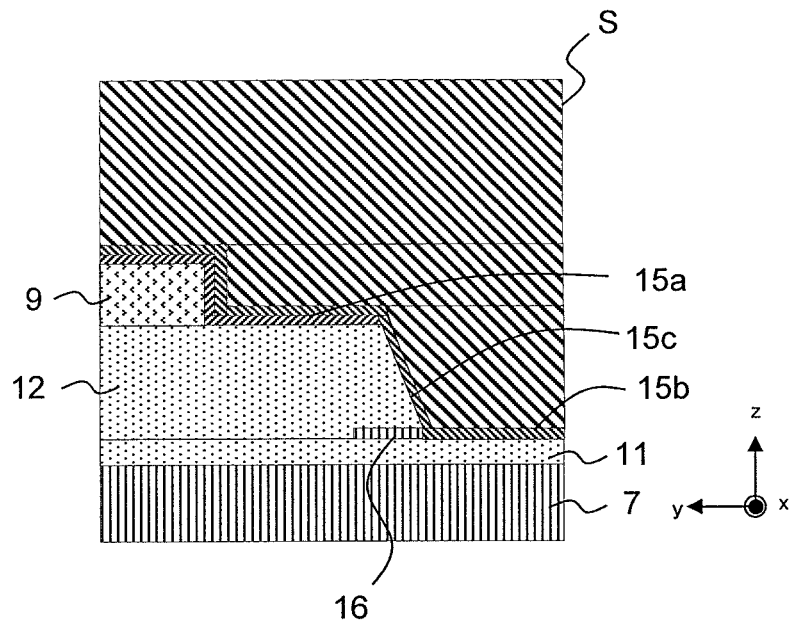
FIG. 4 is a partial cross-sectional view of a magnetic head relating to another embodiment.

The present invention is not limited to the embodiment above. In another embodiment, the side surface 15c is formed non-perpendicularly to the first and second surfaces 15b. With reference to FIG. 4, the side surface 15c extends from the end part of the first surface 15a to a direction that becomes closer to the air bearing surface S and downward in the z direction, and is connected to the further end part of the second surface 15b from the air bearing surface S. Such slanted side surface 15c can be formed using anisotropic etching.

Figure 5:
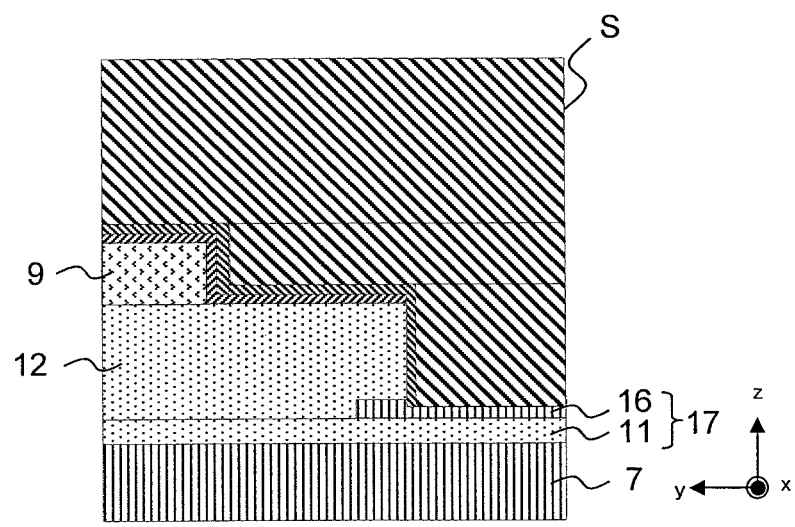
FIG. 5 is a partial cross-sectional view of a magnetic head relating to another embodiment.

In another embodiment, the stopper layer 18 is removed partially in the film thickness direction. The remaining stopper layer 18 can be utilized as a portion of an insulation layer (gap layer 17) between the main magnetic pole layer 7 and the magnetic shield 8. With reference to FIG. 5, a portion in the stopper layer 18 that is further from the air bearing surface S beyond the virtual line 20 is not changed by the etching step. In the meantime, for a portion closer to the air bearing surface S from the virtual line 20 in the stopper layer 18, although an upper portion of the film thickness is partially removed due to the etching step, the lower part remains as is. The remaining lower part of the stopper layer 18 comprises the gap layer 17 between the main magnetic pole layer 7 and the magnetic shield 8 along with the first insulation layer 11.

The preferred embodiments of the present invention were proposed and explained in detail, and it should be understood that they would be variously modifiable and correctable as long as without departing from the attached scope of claims and concept.

What is claimed is:

1. A method for manufacturing a magnetic head, comprising:

providing a stopper layer on an upper surface of a main magnetic pole layer that applies a magnetic flux to a recording medium, via a first insulation layer;

providing a second insulation layer on an upper surface of the first insulation layer so as to cover at least an entire surface of the stopper layer;

covering a portion of an upper surface of the second insulation layer with a mask layer; forming a height difference portion configured with a first surface, which is the upper surface of the second insulation layer protected by the mask layer, a second surface closer to the main magnetic pole layer than the first surface, an air bearing surface, and a side surface connecting the first surface and the second surface, by removing at least a portion of the second insulation layer that is not covered by the mask layer by etching so as to at least partially remove at least a portion of the stopper layer in a film thickness direction, and subsequently by removing the mask layer;

forming an electrode film on the first surface, the second surface and the side surface of the height difference portion; and forming a plating film, which is a magnetic shield for the main magnetic pole layer, on an upper surface of the electrode, the plating film includes a first plating part and a second plating part, the first plating part and the second plating part are integrated with each other, and the first plating part is shorter than a direction perpendicular to the air bearing surface than the second plating part.

2. The method for manufacturing the magnetic head according to claim 1, wherein the plating film is formed up to a position above the electrode film formed on the first surface over the entire region of the electrode film.

3. The method for manufacturing the magnetic head according to claim 1, wherein the side surface is formed perpendicularly to the first and second surfaces.

4. The method for manufacturing the magnetic head according to claim 1, wherein
the side surface is formed non-perpendicularly to the first and second surfaces.

5. The method for manufacturing the magnetic head according to claim 1, wherein
the stopper layer is partially removed in the film thickness direction; and
the remaining stopper layer configures a portion of an insulation layer between the main magnetic pole layer and the magnetic shield.

\* \* \* \* \*